(12) United States Patent
Park et al.

(10) Patent No.: US 9,100,845 B2
(45) Date of Patent: Aug. 4, 2015

(54) METHOD AND APPARATUS FOR MEASURING ANTENNA PERFORMANCE BY COMPARING ORIGINAL AND RECEIVED VOICE SIGNALS

(71) Applicant: Samsung Electronics Co., Ltd., Gyeonggi-do (KR)

(72) Inventors: Gyubok Park, Gyeonggi-do (KR); Kyungkyun Kang, Gyeonggi-do (KR); Jaehee Kim, Gyeonggi-do (KR); Joonho Byun, Gyeonggi-do (KR)

(73) Assignee: Samsung Electronics Co., Ltd (KR)

( * ) Notice: Subject to any disclaimer, the term of this patent is extended or adjusted under 35 U.S.C. 154(b) by 31 days.

(21) Appl. No.: 13/965,894

(22) Filed: Aug. 13, 2013

(65) Prior Publication Data

US 2014/0045435 A1  Feb. 13, 2014

(30) Foreign Application Priority Data

Aug. 13, 2012 (KR) .................. 10-2012-0088145

(51) Int. Cl.
*H04W 24/00* (2009.01)
*H04W 24/06* (2009.01)
*H04W 88/08* (2009.01)

(52) U.S. Cl.
CPC .............. *H04W 24/00* (2013.01); *H04W 24/06* (2013.01); *H04W 88/08* (2013.01)

(58) Field of Classification Search
CPC ........ H04W 24/00; H04W 24/06; H04M 1/24
USPC ............. 455/67.11, 67.12, 67.13, 114.2, 423, 455/570
See application file for complete search history.

(56) References Cited

U.S. PATENT DOCUMENTS

| | | | |
|---|---|---|---|
| 7,327,985 B2* | 2/2008 | Morfitt et al. ............. | 455/67.11 |
| 7,742,790 B2* | 6/2010 | Konchitsky et al. .......... | 455/570 |
| 7,865,361 B2* | 1/2011 | Rambo et al. ................. | 704/226 |
| 8,327,211 B2* | 12/2012 | Zopf ............................ | 714/748 |
| 8,737,571 B1* | 5/2014 | Seeley et al. ................. | 379/1.03 |
| 8,872,080 B2* | 10/2014 | Valenzuela Valdes et al. ................. | 219/756 |
| 2009/0061843 A1* | 3/2009 | Topaltzas ....................... | 455/423 |
| 2012/0282863 A1* | 11/2012 | Guo et al. .................. | 455/67.12 |

* cited by examiner

*Primary Examiner* — Sonny Trinh
(74) *Attorney, Agent, or Firm* — The Farrell Law Firm, P.C.

(57) ABSTRACT

A method and apparatus for measuring an antenna performance includes obtaining a voice signal received or transmitted through an antenna and corresponding to an original voice signal, quantifying the antenna performance to generate a quantification result by performing a quantification method based on the original voice signal and the obtained voice signal, and displaying the quantification result.

20 Claims, 9 Drawing Sheets

METHOD AND APPARATUS FOR MEASURING ANTENNA PERFORMANCE BY COMPARING ORIGINAL AND RECEIVED VOICE SIGNALS

PRIORITY

This application claims priority under 35 U.S.C. §119(a) to a Korean patent application filed on Aug. 13, 2012 in the Korean Intellectual Property Office and assigned Serial No. 10-2012-0088145, the contents of which are incorporated herein by reference.

BACKGROUND OF THE INVENTION

1. Field of the Invention

The present invention relates generally to a method and a system for measuring performance of an antenna, and more particularly, to a method and a system for identifying quantified performance of an antenna by performing a quantification method in a channel environment.

2. Description of the Related Art

Conventional mobile terminal manufacturers perform field tests by using a real or test communication network in order to identify antenna performance of a terminal, and determine whether a desired antenna performance is obtained based on a result of the field test. For example, in order to identify antenna emission performance, a manufacturer tests a transmission/receipt mute, a transmission/receipt rate, or a depreciation rate by contacting the terminal to a hand and a head of a human being according to a test procedure in the real communication network or a test communication network environment installed for the test.

However, the conventional antenna performance measurement system determines the antenna performance according to a measurer's measurement method and a subjective opinion of the measurer or of an evaluator of the measurements, which yields indefinite measurement results. In addition, by repeating indefinite measurement procedures, a loss in time and development costs are incurred.

SUMMARY OF THE INVENTION

The present invention has been made to address at least the above problems and disadvantages, and to provide at least the advantages described below. Accordingly, an aspect of the present invention provides a method and a system for measuring performance of an antenna, in which the performance of the antenna is quantified for measurement by performing a quantification method in a channel environment.

Another aspect of the present invention further provides a method and a system for measuring performance of an antenna, in which a quantification method is performed based on a voice signal generated in an actual environment in which the antenna is operated to measure the performance of the antenna.

In accordance with an aspect of the present invention, a method of measuring antenna performance includes obtaining a voice signal received or transmitted through an antenna, quantifying antenna performance by performing a quantification method based on an original voice signal and the obtained voice signal, and displaying a quantification result.

In accordance with another aspect of the present invention, a method of measuring antenna performance includes generating the original voice signal, and transmitting the original voice signal to a base station simulator, which communicates with the antenna or a terminal that communicates using the antenna.

In accordance with another aspect of the present invention, a system for measuring antenna performance includes a communication unit configured to obtain a voice signal received or transmitted through an antenna, a controller configured to quantify antenna performance by performing a quantification method based on an original voice signal and the obtained voice signal, and a display unit configured to display a quantification result.

BRIEF DESCRIPTION OF THE DRAWINGS

The objects, features and advantages of the present invention will be more apparent from the following detailed description in conjunction with the accompanying drawings, in which.

DETAILED DESCRIPTION OF EMBODIMENTS OF THE INVENTION

Embodiments of the present invention are described with reference to the accompanying drawings in detail. The same reference numbers are used throughout the drawings to refer to the same or like parts. Detailed descriptions of well-known functions and structures incorporated herein are omitted for the sake of clarity and conciseness.

The principles and features of this invention may be employed in varied and numerous embodiments without departing from the scope of the invention.

Among the terms set forth herein, a terminal refers to any type of device capable of processing data that is transmitted or received to or from any external entity. The terminal displays icons or menus on a screen to which stored data and various executable functions are assigned or mapped. The terminal includes a computer, a notebook, a tablet Personal Computer (PC), and a mobile device, for example.

Among the terms set forth herein, a screen refers to a display or other output devices which visually display information to the user, and which optionally are capable of receiving and electronically processing tactile inputs from a user using a stylus, a finger, or other techniques for conveying a user selection from the user to the output devices.

The present invention is applied to measure a performance of an antenna.

The present invention relates to a method of measuring the antenna performance and applies to a general electronic terminal such as a smart phone, a portable terminal, a mobile terminal, a Personal Digital Assistant (PDA), a Portable Multimedia Player (PMP), a laptop computer, a note pad, a Wibro terminal, a tablet PC, a smart TV, a smart refrigerator as well as all types of known devices that use an antenna, for measuring the antenna performance.

Figure 1:
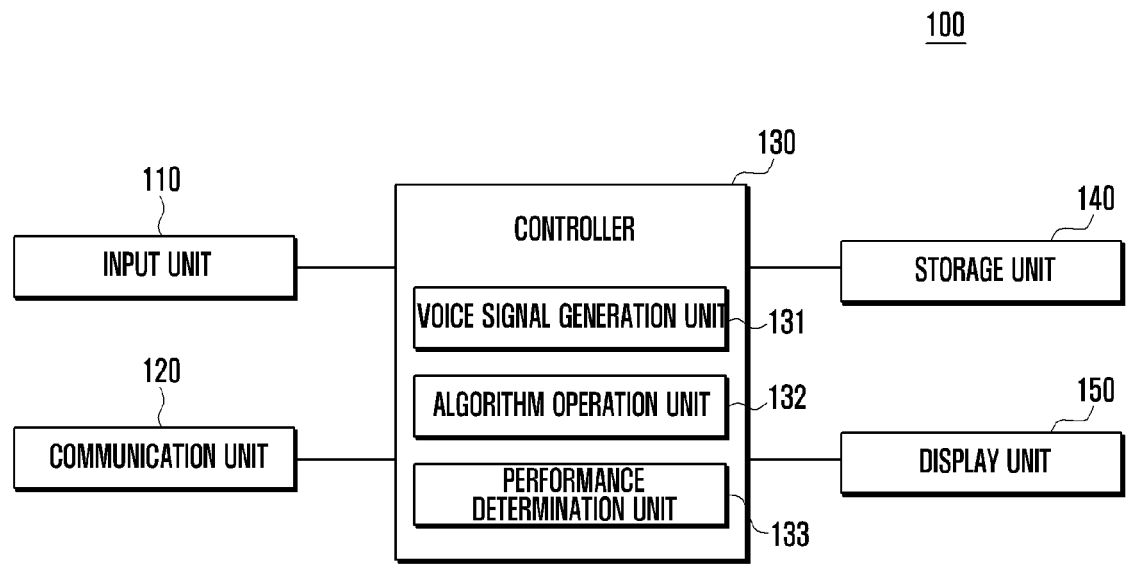
FIG. 1 illustrates a configuration of an antenna performance measurement system according to an embodiment of the present invention.

FIG. 1 illustrates a configuration of an antenna performance measurement system according to an embodiment of the present invention Referring to FIG. 1, an antenna performance measurement system 100 is configured to include an input unit 110, a communication unit 120, a controller 130, a storage unit 140, and a display unit 150.

The input unit 110 generates a manipulation signal or an input signal according to an input from a user, such as a voice input, a manual input, or other inputted information. The input unit 110 includes, for example, a keypad, a dome switch, a touch pad that uses a constant voltage/constant current implementation, a jog wheel, and a jog switch.

The input unit 110 receives an input from the user for generating, transmitting, or receiving a voice signal. The input unit 110 receives an input from the user to display a result of an antenna performance measurement or to store, maintain, or edit the result of the antenna performance measurement.

The communication unit 120 includes an antenna and communicates such as data, voice, and video communications with an external device by using a wired or wireless communication technology, such as a short-range communication technology. The wireless communication technology includes, for example, wireless Local Area Network (WLAN), Wi-Fi, Wireless broadband (Wibro), Worldwide inter operability for microwave access (Wimax), and High Speed Downlink Packet Access (HSDPA), or any other known wireless communication technology. A wireless short-range communication technology includes, for example, BLUETOOTH®, Radio Frequency IDentification (RFID), Infrared Data Association (IrDA), Ultra WideBand (UWB), or ZigBee®, IEEE 802-based technology, or any other known communication technology. A wired short-range communication technology uses, for example, a Universal Serial Bus (USB), an IEEE 1394 compatible device, or devices complying with THUNDERBOLT technology, commercially available from INTEL® CORPORATION. The communication unit 120 includes at least one communication module such as BLUETOOTH®, ZigBee®, UWB, wireless USB, Near Field Communication (NFC), or wireless LAN, for data communication.

The communication unit 120 obtains a voice signal received or transmitted through the antenna. Also, the communication unit 120 transmits an original voice signal to a base station simulator 20, shown in FIG. 3, which communicates with the antenna or a terminal 30, shown in FIG. 3, wherein the terminal 30 communicates by using the antenna.

The communication unit 120 downloads or uploads a program for executing an antenna performance measurement method according to the present invention.

The controller 130 controls each element for operating the antenna performance measurement system 100, such as to perform an operation for antenna performance measurement.

The controller 130 includes a voice signal generation unit 131, an algorithm operation unit 132, and a performance determination unit 133.

The voice signal generation unit 131 generates the original voice signal. The original voice signal is to be compared with the voice signal received or transmitted through the antenna of the communication unit 120, and the antenna performance is determined according to similarity between the original voice signal and the voice signal received or transmitted through the antenna. The original voice signal is based on a voice preset by the user or manufacturer of the antenna performance measurement system 100. The voice signal generation unit 131 generates the original voice signal at a preset duration time or for a preset period.

The original voice signal generated through the voice signal generation unit 131 is transmitted through the antenna of the communication unit to the base station simulator 20 which communicates with the antenna through the communication unit 120, or to the terminal 30 which communicates by using the antenna.

The algorithm operation unit 132 performs a quantification method, implementing an algorithm, for quantifying the antenna performance. The algorithm operation unit 132 performs the quantification method based on the original voice signal and the voice signal received or transmitted through the antenna. For example, the quantification method is a Perceptual Evaluation of Speech Quality (PESQ) quantification method known in the art, such as ITU-T Recommendation P.862. The algorithm operation unit 132 compares a factor according to a channel environment of the antenna by using the quantification method and assigns a score by evaluating a comparison result. The algorithm operation unit 132 assigns a weight to the score of each factor and collects statistics or averages the scores to quantify an overall antenna performance.

The performance determination unit 133 evaluates the performance of the antenna based on a quantification result. For example, when the quantification result is equal to or greater than a threshold value, the performance determination unit 133 determines the antenna performance as an effective performance. When the quantification result is below the threshold value, the performance determination unit 133 determines the antenna performance as corresponding to an actual performance. The performance determination unit 133 determines the quantification result as a reception or transmission performance of the antenna depending on whether the voice signal is received or transmitted through the antenna.

The controller 130 controls the communication unit 120 to transmit the original voice signal generated through the voice signal generation unit 131 to the base station simulator 20, which communicates with the antenna or the terminal 30, which communicates by using the antenna.

The controller 130 quantifies the antenna performance through the algorithm operation unit 132 and controls the display unit 150 to display the quantification result. The controller 130 controls the display unit 150 to display performance information determined through the performance determination unit 133.

The storage unit 140 stores data as well as a program or commands for the antenna performance measurement system 100. The controller 130 may execute the program or commands stored in the storage unit 140.

The storage unit 140 includes at least one type of storage media such as a flash memory type, a hard disk type, a multimedia card micro type, a card type memory such as an SD or XD memory, a Random Access Memory (RAM), a static random access memory, a Read-Only Memory (ROM), an Electrically Erasable Programmable Read-Only Memory (EEPROM), or a Programmable Read-Only Memory (PROM).

The storage unit 140 stores the original voice signal and/or the voice signal received or transmitted through the antenna temporarily or permanently.

The storage unit 140 stores, for example, a quantification method, a computer code, a mathematical equation, factor information, and/or evaluation criteria information for quantifying the antenna performance. The storage unit 140 stores the quantification result of the antenna performance temporarily or permanently.

The storage unit 140 stores a program for performing the antenna performance measurement method according to the present invention.

The display unit 150 displays or otherwise outputs information processed by the antenna performance measurement system 100. For example, the display unit 150 displays a User Interface (UI), a Graphic User Interface (GUI), a graph, or a number related to the antenna performance measurement.

The display unit 150 includes at least one of a Liquid Crystal Display (LCD), a Thin Film Transistor LCD (TFT LCD), an Organic Light Emitting Diode (OLED), a flexible display, and a three dimensional (3D) display.

The display unit 150 may operate as a touch screen having an inter-layer structure with a touch sensor, which is included in the input unit 110. In this case, the display unit 150 performs a function as an input apparatus, and is included in or operates in conjunction with the input unit 110.

The display unit 150 displays the quantification result of the antenna performance. The display unit 150 displays an indication of an effective performance or an actual performance depending on the antenna performance determination result.

In alternative embodiments of the present invention, some elements and components shown in FIG. 1 may not be necessary, in which cases the antenna performance measurement system 100 is implemented by more or fewer elements and components.

Figure 2:
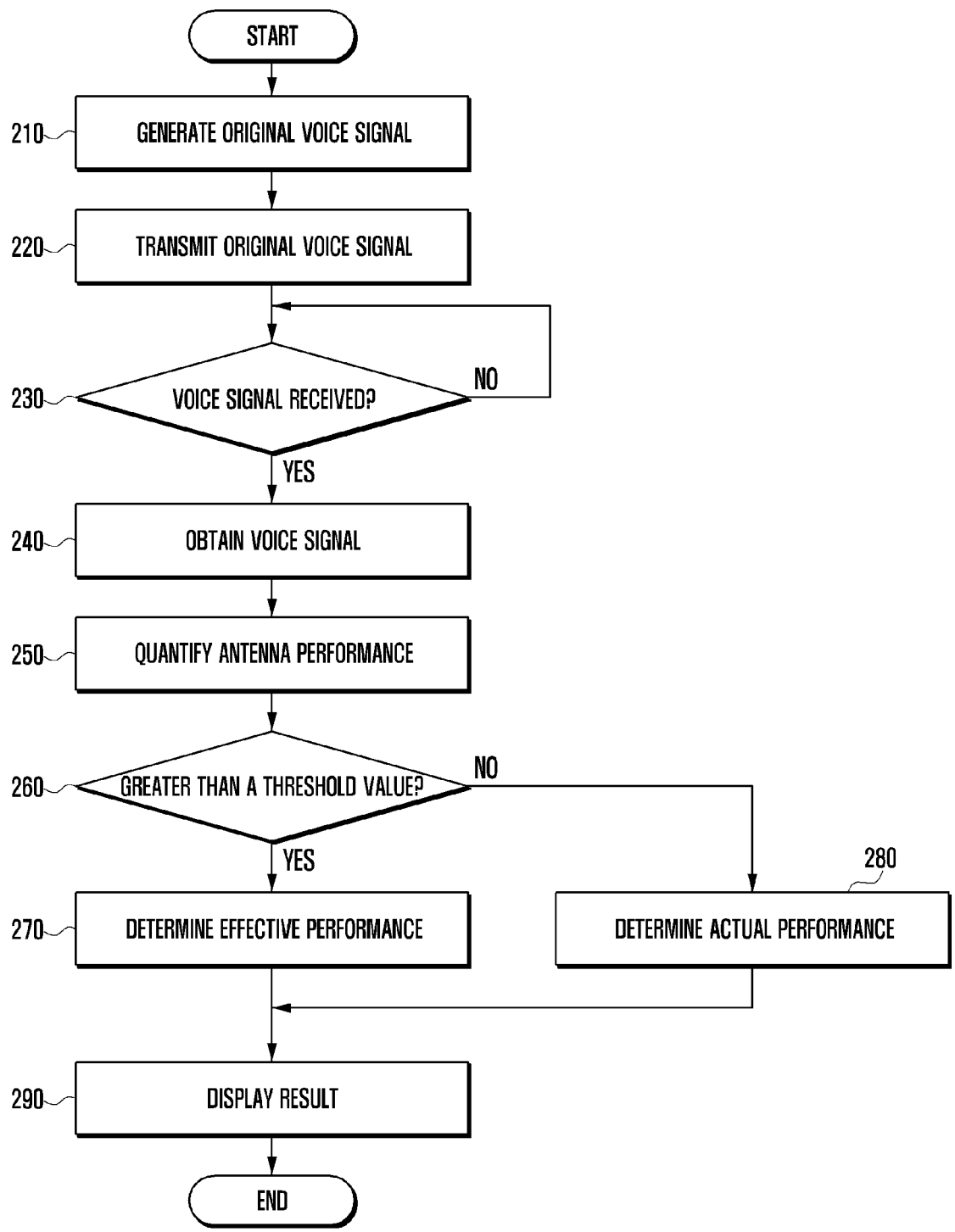
FIG. 2 illustrates an antenna performance measurement method according to an embodiment of the present invention.

FIG. 2 illustrates an antenna performance measurement method according to an embodiment of the present invention.

The antenna performance measurement system 100 generates the original voice signal in step 210.

The original voice signal is to be compared with the voice signal received or transmitted through the antenna, and the antenna performance is determined according to similarity between the original voice signal and the voice signal received or transmitted through the antenna. The original voice signal is generated from a voice preset or previously input by the user or preset by the manufacturer of the antenna performance measurement system 100. The original voice signal corresponds to a human language and is a spoken vocabulary of various words or a sentence. The original voice signal is the original voice modulated into an analog or digital signal and has a form to be transmitted to an external device by performing communications with the external device. For example, the original voice signal is a voice saying "one, two, three, four, five, six, seven, eight, nine, ten," which is modulated into the analog or digital signal.

Alternatively, the original voice signal is generated by a separate apparatus, instead of by the antenna performance measurement system 100.

The antenna performance measurement system 100 transmits the original voice signal in step 220.

Figure 3:
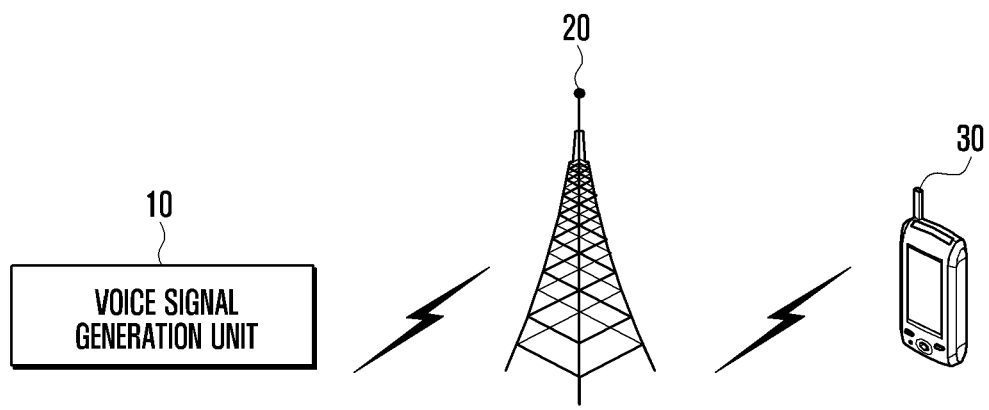
FIG. 3 illustrates an example path of transmitting an original voice signal and obtaining a voice signal.

The antenna performance measurement system 100 transmits the original voice signal to the base station simulator 20 in FIG. 3, which communicates with the antenna of which performance is to be measured or to a terminal 30 in FIG. 3, which communicates through the antenna. The antenna performance measurement system 100 transmits the original voice signal during a preset time period or for a preset number of times. The antenna performance measurement system 100 transmits the original voice signal using wired connections such that a loss, modification, or delay of the original voice signal is minimized.

Referring to FIG. 3, the antenna performance measurement system 100 transmits the original voice signal to the base station simulator 20. The original voice signal transmitted to the base station simulator 20 is encoded by the base station simulator 20 into a wireless signal, according to a Code Division Multiple Access (CDMA) method or a Global System for Mobile communications (GSM) method.

The wireless signal is emitted by the base station simulator 20 into a region in which the antenna of the communication unit 120 is operated and received by the antenna. The received wireless signal has a portion that is lost, modified, or delayed, according to the channel environment in which the antenna is operated. The terminal 30 operatively and/or physically connected to the antenna decodes the received wireless signal to be modulated into the voice signal.

The voice signal has a portion of the original voice signal that is lost, modified, or delayed, according to the channel environment. For example, when the original voice signal corresponds to "one, two, three, four, five, six, seven, eight, nine, ten," the received wireless signal corresponds to "one, . . . , three, . . . , . . . , six, seven, eight, . . . , ten." Alternatively, the received wireless signal corresponds to "one, . . . , four, . . . five, si, . . . , seven, eight, nine, te."

Figure 4:
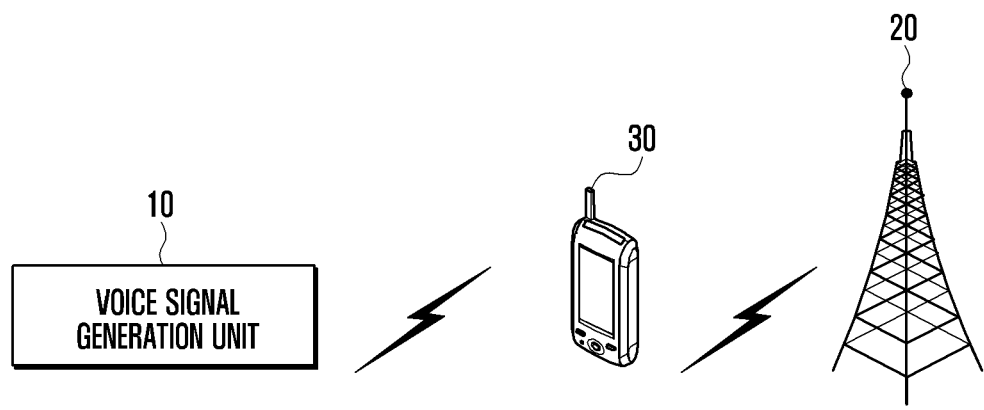
FIG. 4 illustrates another example path of transmitting the original voice signal and obtaining the voice signal.

Referring to FIG. 4, the antenna performance measurement system 100 transmits the original voice signal to the terminal 30, which communicates through the antenna. The original voice signal transmitted to the terminal 30 is encoded by the terminal 30 into a wireless signal according to CDMA or GSM. The wireless signal is emitted by the antenna operatively or physically connected to the terminal 30 into a region in which the base station simulator 20 is operated, and is received by the base station simulator 20. The received wireless signal is lost, modified, or delayed, according to the channel environment in which the antenna of the communication unit 120 is operated.

The base station simulator 20 decodes the received wireless signal to be modulated into the voice signal, which has a portion of the original voice signal that is lost, modified, or delayed, according to the channel environment. For example, when the original voice signal corresponds to "one, two, three, four, five, six, seven, eight, nine, ten," the received wireless signal corresponds to "one, . . . , three, . . . , . . . , six, seven, eight, . . . , ten." Alternatively, the received wireless signal corresponds to "one, . . . , four, . . . five, si, . . . , seven, eight, nine, te."

The terminal 30 may operate in a Raleigh fading environment, a Gaussian fading environment or a Rician fading environment. For example, the terminal 30 may operate in an environment that is the same or similar to an actual indoor or downtown environment. The Raleigh fading environment, the Gaussian fading environment, or the Rician fading environment may be artificially generated. For example, referring to FIG. 5, the Raleigh fading environment, the Gaussian fading environment, or the Rician fading environment is artificially generated within a closed chamber in which a uniform electromagnetic field 31 is provided. For example, the closed chamber is implemented by uniformly applying the electromagnetic field 31 from all directions by which an electron is reflected by a stirrer or scatter, such that the electromagnetic field 31 is formed as the Raleigh fading environment, the Gaussian fading environment, or the Rician fading environment in the closed chamber. The electromagnetic field is applied to form a weak electromagnetic field.

The antenna of the communication unit 120 or the terminal 30 communicating through the antenna may operate within the closed chamber in which the electromagnetic field 31 is provided. The antenna or the terminal 30 which communicates through the antenna may rotate within the closed chamber in order to uniformly receive the electromagnetic field 31. By providing a separate antenna 32 for receiving an external signal within the closed chamber, the terminal 30 transmits or receives a wireless signal to/from an external base station simulator 20 through the separate antenna 32.

Figure 5:
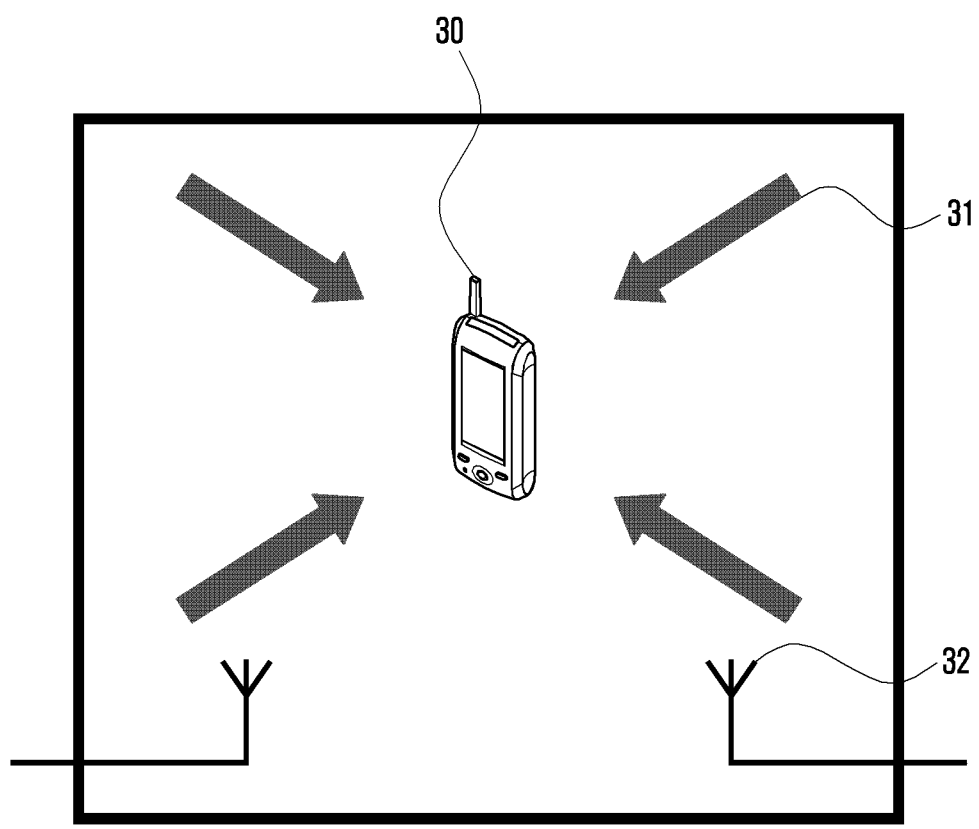
FIG. 5 illustrates an environment in which an antenna is operated.

In the example shown in FIG. 5, the terminal 30 is disposed in the chamber, but in alternative embodiments, the entire antenna performance measurement system 100 or at least the antenna of the communication unit 120 are disposed in the chamber of FIG. 5 in addition to or instead of the terminal 30. In further alternative embodiments, the antenna performance measurement system 100 is incorporated in the terminal 30, with the components shown in FIG. 1 being components of the terminal 30.

Referring back to FIG. 2, the antenna performance measurement system 100 determines whether the voice signal is received in step 230.

When the voice signal is not received, the antenna performance measurement system 100 performs a standby operation in the antenna performance measurement, by returning back to step 230 until the voice signal is received, until the antenna performance measurement is terminated according to a user's request or after elapse of a preset time period in which no voice signal is received in step 230.

When the voice signal is received in step 230, the antenna performance measurement system 100 obtains the voice signal in step 240.

The antenna performance measurement system 100 obtains the voice signal received or transmitted through the antenna of the communication unit 120.

The antenna performance measurement system 100, as shown in FIG. 3, obtains a signal after the original voice signal is emitted through the base station simulator 20 and received and modulated through the antenna of the communication unit 120. The antenna performance measurement system 100, as shown in FIG. 4, obtains a signal after the original voice signal is transmitted by the antenna of the communication unit 120 and received and modulated through the base station simulator 20. The voice signal is the original voice signal in which a portion thereof is lost, modified, or delayed. For example, if the original voice signal corresponds to "one, two, three, four, five, six, seven, eight, nine, ten", the voice signal corresponds to "one, . . . , three, . . . , . . . , six, seven, eight, . . . , ten." Alternatively, the voice signal corresponds to "one, . . . , four, . . . , five, si, . . . , seven, eight, nine, te."

As shown in FIG. 5, the antenna performance measurement system 100, incorporated into the terminal 30 in an alternative embodiment, obtains the voice signal received or transmitted through the antenna which operates in the Raleigh fading environment, the Gaussian fading environment, or the Rician fading environment that is artificially generated in the closed chamber in which the uniform electromagnetic field 31 is provided.

The antenna performance measurement system 100 obtains the voice signal during a preset time period, during which the antenna performance measurement system 100 receives the voice signal that is transmitted or received through the antenna. Thus, the antenna performance measurement system 100 may measure how much the transmitted or received signal is lost, modified, or delayed through the antenna with respect to the original voice signal during the same time period. Alternatively, when the original voice signal is transmitted to the antenna or the base station simulator 20 for the preset number of times, the antenna performance measurement system 100 may measure how much the transmitted or received signal is lost, modified, or delayed through the number of the voice signals transmitted or received through the antenna.

Referring back to FIG. 2, the antenna performance measurement system 100 quantifies the antenna performance in step 250, by performing a quantification method based on the original voice signal and the obtained voice signal. In one example, the antenna performance measurement system 100 quantifies the antenna performance by using the quantification method to compare and evaluate the original voice signal and the obtained voice signal. For example, the antenna performance measurement system 100 performs the PESQ quantification method to quantify the antenna performance. When the original voice signal is transmitted during the preset time period or for the preset number of times to obtain a plurality of voice signals, the antenna performance measurement system 100 repeatedly performs the quantification method based on a plurality of original and obtained voice signals.

Figure 6:
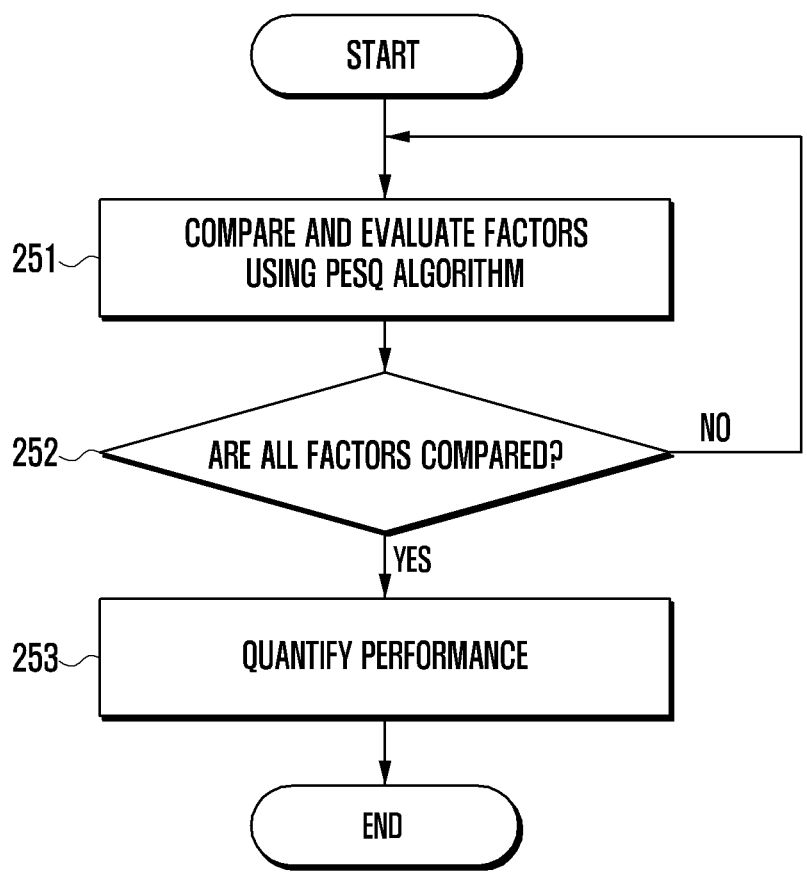
FIG. 6 illustrates a method of quantifying antenna performance according to an embodiment of the present invention.

FIG. 6 illustrates in detail step 250 of FIG. 5, such that the antenna performance measurement system 100 compares and evaluate factors by using the PESQ quantification method in step 251, implemented, for example, by the algorithm operation unit 132.

The PESQ quantification method, which is a quantification method for evaluating a voice system, evaluates a call quality by comparing and evaluating the original signal and an attenuated signal outputted after the original signal passes through a communication system. Specifically, the PESQ quantification method compares the original signal and the attenuated signal for each of a plurality of factors known in the art, and assigns an evaluation score according to criteria specified by the PESQ quantification method. The PESQ quantification method assigns a weight to the evaluation score of each factor and collects statistics or averages the evaluation scores to evaluate an overall call quality. The plurality of factors to be compared includes at least one of a plurality of accuracy factors such as a speech input level to a codec, a transmission channel error, packet loss, packet loss concealment, a bit rate, transcodings, environmental noise, and a varying delay effect, and also includes at least one of a plurality of non-accuracy factors such as a listening level, volume loss, an effect of delay, talker echo, and a side tone.

The antenna performance measurement system 100 compares, evaluates, and quantifies factors according to the channel environment of the antenna by using the PESQ quantification method. The antenna performance measurement system 100 compares the original voice signal and the obtained voice signal according to the channel environment. The factors according to the channel environment include at least one of a Total Radiated Power (TRP), a Total Isotropic Sensitivity (TIS), and a channel delay.

The antenna performance measurement system 100 assigns a score to a comparison result of each factor according to an evaluation criterion. For example, the antenna performance measurement system 100 assigns the score to the comparison result of each factor according to similarity on a four-point scale, using methods known in the art.

When the original voice signal corresponds to "one, two, three, four, five, six, seven, eight, nine, ten" and the obtained voice signal corresponds to "one, . . . , three, . . . , . . . , six, seven, eight, . . . , ten," the antenna performance measurement system 100 compares the two signals and assigns a score according to similarity therebetween, using methods known in the art. For example, when a perfect score is 4, six out of ten signals of the original voice signal and the obtained voice signal are similar and the antenna performance measurement system 100 assigns a 2.5 score to the comparison result.

Referring to FIG. 6, the antenna performance measurement system 100 determines whether all factors are compared in step 252.

In particular, the antenna performance measurement system 100 determines whether all factors for measuring the antenna performance, i.e., the accuracy factors and non-accuracy factors for the PESQ quantification method and a factor according to the channel environment of the antenna are compared and evaluated in step 252.

When the algorithm operation unit 132 determines that all factors are not compared, the antenna performance measurement system 100 repeatedly performs the PESQ quantification method of steps 251-252 by returning back to step 251 until all the factors are compared and evaluated.

When the algorithm operation unit 132 determines that all the factors are compared, the antenna performance measurement system 100 quantifies the antenna performance in step 253, and then end step 250 and proceeds to step 260 in FIG. 2.

The antenna performance measurement system 100 quantifies overall performance into one number by calculating an average of the scores assigned to the comparison result or by an equation known in the art. The antenna performance measurement system 100 assigns a weight to each score according to the comparison result of each element and collects statistics or averages the scores to quantify the overall antenna performance. Thus, the antenna performance measurement system 100 quantifies the antenna performance in step 250 by using the PESQ quantification method while taking into account a channel environment factor that operates as an important factor of antenna performance evaluation, thereby objectively providing antenna performance.

The antenna performance measurement system 100 quantifies transmission or reception performance of the antenna depending on whether the voice signal is transmitted or received through the antenna.

The antenna performance measurement system 100 determines whether the quantification result is greater than or equal to a threshold value in step 260.

The antenna performance measurement system 100 determines whether the quantification result is greater than or equal to the threshold value based on a threshold value, which is set by the user or by the manufacturer of the antenna performance measurement system 100, and the threshold value is used for determining whether the antenna and the terminal 30 including the antenna have a performance sufficient for commercialization.

When the quantification result is equal to or greater than the threshold value in step 260, the antenna performance measurement system 100 determines the antenna performance as an effective performance in step 270, depending on whether the voice signal is a signal transmitted or received through the antenna. The method then proceeds to step 290 where the result is displayed.

When the quantification result is less than the threshold value in step 260, the antenna performance measurement system 100 determines the antenna performance as an actual performance in step 280, and the method then proceeds to step 290.

The antenna performance measurement system 100 displays the result in step 290 and the method then ends.

Figure 7:
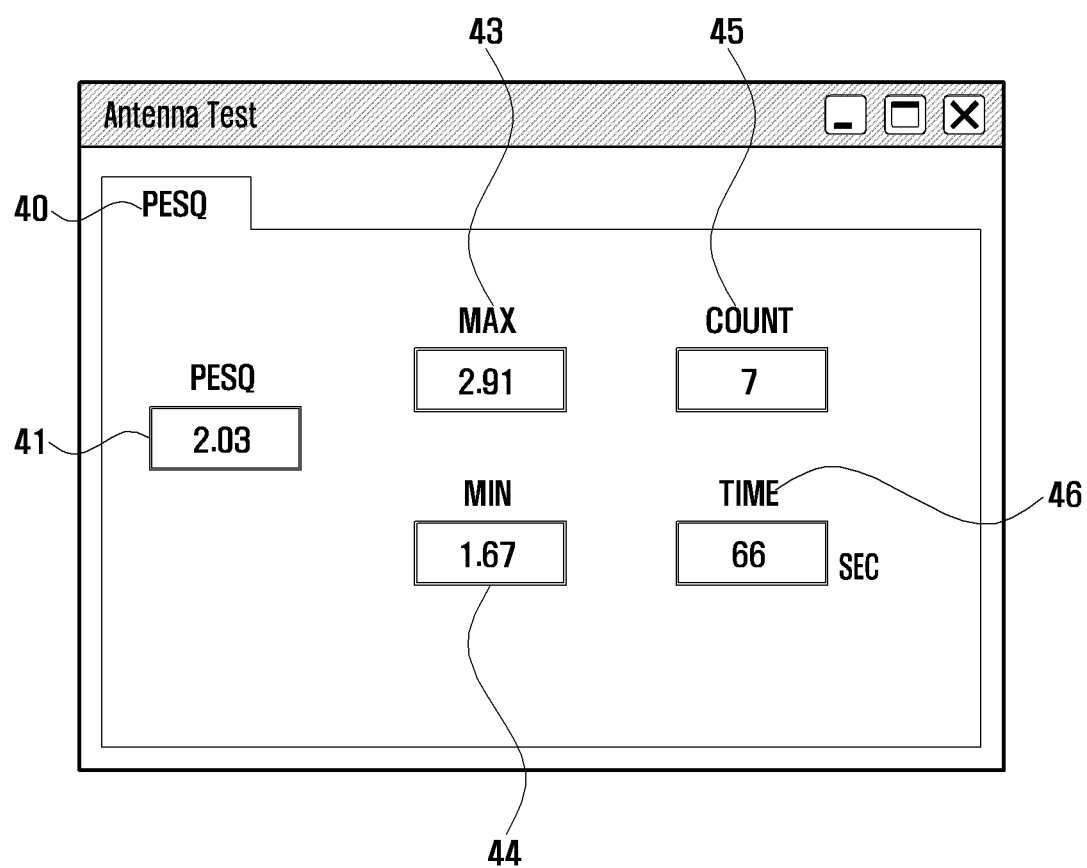
FIG. 7 illustrates an example of displaying a result of antenna performance measurement according to an embodiment of the present invention.

The antenna performance measurement system 100 displays the quantification result and/or performance determination result. For example, referring to FIG. 7, the antenna performance measurement system 100 displays a PESQ quantification method performance result in a PESQ window or screen 40 through the display unit 150. Specifically, the antenna performance measurement system 100 displays the quantification result 41 according to execution of the PESQ quantification method. When the antenna performance is quantified based on a plurality of original voice signals transmitted during the preset time period or for the preset number of times, the antenna performance measurement system 100 displays a maximum quantification result 43 with respect to the plurality of the original voice signal and a minimum quantification result 44. The antenna performance measurement system 100 displays the number 45 of the transmitted original voice signals and/or the time period 46 during which the original voice signal is transmitted or received.

Figure 8:
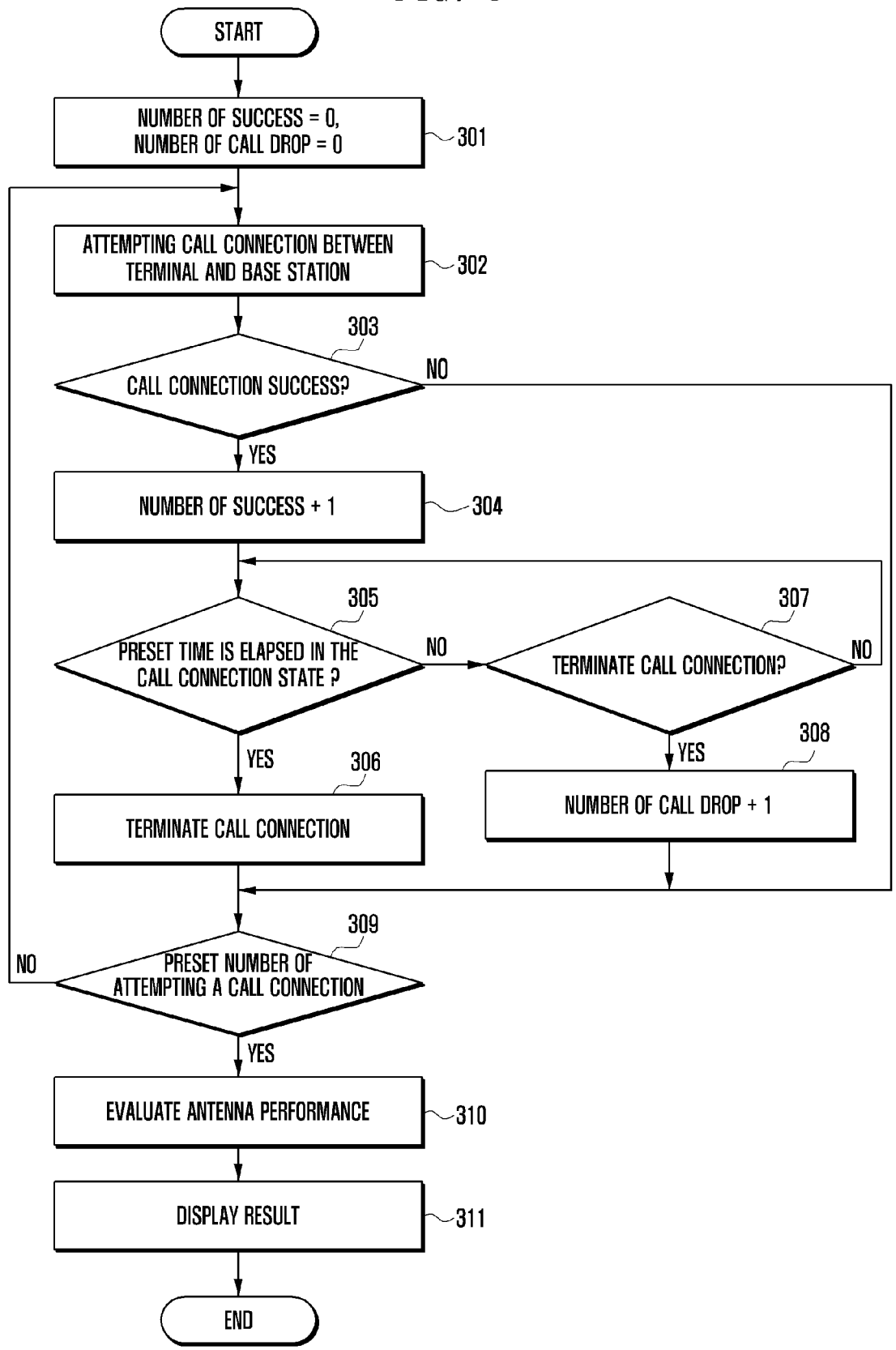
FIG. 8 illustrates a method of measuring an antenna reception rate, transmission rate, and drop rate of according to an embodiment of the present invention.

FIG. 8 illustrates a method of measuring an antenna reception rate, transmission rate, and drop rate of according to an embodiment of the present invention.

Referring to FIG. 8, the antenna performance measurement system 100 initializes values necessary for the measurement in step 301.

For example, the antenna performance measurement system 100 initializes the number of call successes for counting the number of call successes, the number of call drops for counting the number of call drops during a call, and a value n for counting the number of call connection attempts as o. The values necessary for the measurement are illustrated with a few examples, but are not limited thereto and there may be various values used.

The antenna performance measurement system 100 attempts a call connection between a terminal and a base station in step 302.

The antenna performance measurement system 100 controls the base station simulator 20 to attempt a call connection to the terminal 30. Independently of the control of the antenna performance measurement system 100, the base station simulator 20 is manually controlled to attempt a call connection to the terminal 30. The base station simulator 20 radiates a call connection signal in the air (to a closed space, when an antenna is tested in a closed space) to attempt a call connection. The terminal 30 receives the call connection signal through the antenna. The call connection signal is correctly received or is not received according to an operation environment of the antenna or a performance of the antenna. Accordingly, in the present invention, the antenna performance measurement system 100 measures the number of call successes as the call connection signal is correctly received through the antenna.

In addition, the antenna performance measurement system 100 controls the terminal 30 to attempt a call connection to the base station simulator 20. Independently of the control of the antenna performance measurement system 100, the terminal 30 is manually controlled to attempt a call connection to the base station simulator 20. The terminal 30 radiates the call connection signal in the air (to a closed space, when antenna is tested in a closed space) to attempt a call connection. The call connection signal is correctly transmitted to the base station simulator 20 according to an operation environment of the antenna or a performance of the antenna, or is not transmitted due to a loss of transmission. The antenna performance measurement system 100 measures the number of call connection successes as the call connection signal is correctly transmitted through the antenna.

The antenna performance measurement system 100 attempts the call connection a preset number of times, and measures the number of call successes among the numbers of attempting a call connection. As the preset number of call connection attempts increases, the accuracy of measurement result increases. However, since the measurement is time-consuming, the preset number of call connection attempts is previously set with a suitable value in consideration of accuracy and a measurement time.

The antenna performance measurement system 100 defines an arbitrary constant number n so as to determine whether the call connection is attempted the preset number of times. The antenna performance measurement system 100 increases the constant number n by 1 whenever attempting a call connection, and terminates the measurement of reception rate/transmission rate/drop rate when the n is identical with the preset number of call connection attempts. The antenna performance measurement system 100 increases the constant number n by 1 after attempting a call connection between the terminal and the base station.

The antenna performance measurement system 100 determines whether the call connection is successful in step 303.

The antenna performance measurement system 100 determines whether the call connection signal of the base station simulator 20 or the terminal 30 is correctly received or transmitted through the antenna of the terminal 30 to succeed in the call connection.

When the call connection is successful, the antenna performance measurement system 100 increases the number of success by 1 in step 304.

When the call connection is not successful, the antenna performance measurement system 100 determines whether the constant number n that counts the number of attempting a call connection is greater than or equal to the preset number of call connection attempts in step 309.

When n is greater than or equal to the preset number of call connection attempts, the antenna performance measurement system 100 terminates the measurement of reception rate/transmission rate/drop rate and measures the antenna performance in step 310. When n is less than the preset number of call connection attempts, the antenna performance measurement system 100 returns to step 302 to attempt a call connection between the terminal and the base station, such that the antenna performance measurement of the present invention is repeated.

When the call connection is successful, in order to measure the rate of call drop, the antenna performance measurement system 100 determines whether a preset time is elapsed as a call connection state in step 305.

A call drop refers to a phenomenon in which a call connection is abnormally dropped before the user completes a call. The call drop is generated due to the failure of a wireless section according to the performance of the antenna or the operation environment of the antenna, and operates as an important factor in the measurement of antenna performance.

The antenna performance measurement system 100 determines whether the call is not maintained for a preset time and is abnormally terminated before the call is intentionally terminated after the call connection is successful. The antenna performance measurement system 100 determines whether the preset time is elapsed in the call connection state in step 305.

If the preset time is elapsed, the antenna performance measurement system 100 determines that the call is not dropped, and terminates the call connection for the re-measurement of reception rate/transmission rate/drop rate in step 306.

If the preset time is not elapsed in the call connection state, the antenna performance measurement system 100 determines that the call connection is terminated in step 307. That is, the antenna performance measurement system 100 determines that the call connection is abnormally terminated before the preset time is elapsed.

If the call connection is terminated, the antenna performance measurement system 100 increases the number of call drops by 1 in step 308. If the call connection is not terminated when the preset time is not elapsed, the antenna performance measurement system 100 repeatedly determines whether the preset time is elapsed in the call connection state to measure the drop rate.

After the call connection is terminated normally or abnormally, the antenna performance measurement system 100 determines whether the constant number n that counts the number of call connection attempts is greater than or equal to the preset number of call connection attempts in step 309. That is, in order to measure the reception rate/transmission rate/drop rate, the antenna performance measurement system 100 determines whether call connection is attempted as many times as the preset number.

When n is less than the preset number of call connection attempts, the antenna performance measurement system 100 returns to step 302 to attempt a call connection between the terminal and the base station such that the antenna performance measurement of the present invention is repeated.

When n is greater than or equal to the preset number of call connection attempts, the antenna performance measurement system 100 terminates the measurement of reception rate/transmission rate/drop rate and evaluates the antenna performance in step 310.

The antenna performance measurement system 100 evaluates the reception rate or the transmission rate based on the number n of call connection attempts and the number of call connection successes. For example, if the base station simulator 20 attempts a call connection to the terminal 30 10 times whereas the number of call connection successes is 7 times, the antenna performance measurement system 100 evaluates the reception rate of the antenna included in the terminal 30 as 70%. In addition, if the terminal 30 attempts a call connection to the base station simulator 20 10 times whereas the number of call connection success is 6 times, the antenna performance measurement system 100 evaluates the reception rate of the antenna included in the terminal 30 as 60%.

The antenna performance measurement system 100 evaluates the drop rate based on the number of call connection successes and the number of drops. For example, if the number of call connection successes is 7 times, whereas the number of call drops is 2 times, the antenna performance measurement system 100 determines that the drop rate of the antenna is 28.5%. The number of call connection successes when the base station simulator 20 attempts a call connection to the terminal 30 and the number of call connection successes when the terminal 30 attempts a call connection to the base station simulator 20 are used by summing up, or are separately used to evaluate the drop rate for each case.

The antenna performance measurement system 100 displays the evaluation result of performance in step 311.

Figure 9:
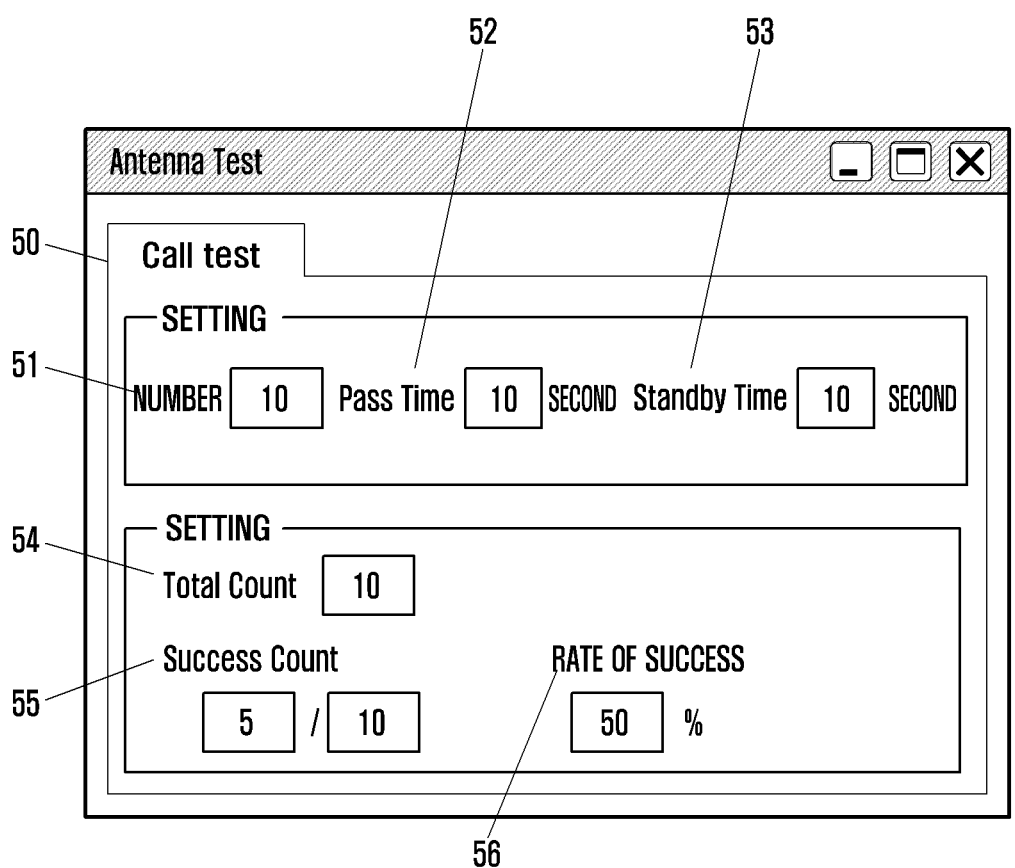
FIG. 9 illustrates an example of displaying a measurement result of antenna reception rate/transmission rate/drop rate according to an embodiment of the present invention.

FIG. 9 illustrates an example of displaying a measurement result of antenna reception rate/transmission rate/drop rate according to the embodiment of the present invention.

Referring to FIG. 9, the antenna performance measurement system 100 displays a call test result 50.

The display screen of the call test result 50 includes a setting screen for call test. For example, in the setting screen, an input window 51 for previously setting the number of call connection attempts between the terminal and the base station is displayed. In addition, the setting screen displays an input window 51 for setting a time for maintaining the call connection or an input window 53 of standby time before attempting a call connection so as to measure the drop rate.

The antenna performance measurement system 100 displays the total number 54 of call connection attempts to the measurement result. The total number 54 of call connection attempts is identical to the preset number 51 of call connection attempts. The antenna performance measurement system 100 displays the number of call connection successes and the number of call connection attempts to the measurement result by digitizing 55 to the measurement result, or displays the calculation result 56 of the success rate.

Although not shown in FIG. 9, the antenna performance measurement system 100 may diversely display the result of measuring the reception rate/transmission rate/drop rate of the antenna and information relevant thereto.

The above-described antenna performance measurement apparatus and methods according to the present invention can be implemented in hardware, firmware or as software or computer code that can be stored in a non-transitory recording medium such as a CD ROM, a RAM, a ROM, a floppy disk, Digital Video Discs (DVDs), a hard disk, a magnetic storage media, an optical recording media, or a magneto-optical disk or computer code downloaded over a network originally stored on a remote recording medium, a computer readable recording medium, or a non-transitory machine readable medium and to be stored on a local recording medium, so that the methods described herein can be rendered in such software that is stored on the recording medium using a general purpose computer, a digital computer, or a special processor or in programmable or dedicated hardware.

As would be understood in the art, the computer, the processor, microprocessor controller or the programmable hardware include memory components, e.g., RAM, ROM, Flash, etc. that store or receive software or computer code that when accessed and executed by the computer, processor or hardware implement the processing methods described herein. In addition, it would be recognized that when a general purpose computer accesses code for implementing the processing shown herein, the execution of the code transforms the general purpose computer into a special purpose computer for executing the processing shown herein. In addition, the program is electronically transferred through any media such as communication signals transmitted by wire/wireless connections, and their equivalents. The computer readable recording medium can also be distributed in network coupled computer systems so that the computer readable code is stored and executed in a distributed fashion.

According to the present invention, antenna performance is quantified by using a PESQ quantification method known in the art, thereby achieving reliability and objectiveness of a result of the antenna performance measurement.

A method and a system for measuring the performance of an antenna of the present invention is combined with automated hardware and software and to implement an antenna performance measurement system through an automated system.

Although embodiments of the present invention have been described in detail hereinabove, it should be clearly understood that many variations and modifications of the basic inventive concepts herein taught which may appear to those skilled in the present art will still fall within the spirit and scope of the present invention, as defined in the appended claims.

What is claimed is:

1. A method of measuring an antenna performance, the method comprising:
   obtaining a voice signal received or transmitted through an antenna corresponding to an original voice signal from the antenna;
   quantifying the antenna performance using a controller to generate a quantification result by performing a quantification method based on the original voice signal and the obtained voice signal; and
   displaying the quantification result on a display,
   wherein the obtained voice signal is generated by demodulating a wireless signal by a terminal or a base station simulator, the wireless signal being modulated from the original voice signal and emitted by the base station simulator or the terminal.

2. The method of claim 1, wherein performing the quantification method comprises:
   using a Perceptual Evaluation of Speech Quality (PESQ) quantification method as the quantification method to compare and evaluate a factor according to a channel environment of the antenna to quantify the antenna performance.

3. The method of claim 2, wherein the factor includes at least one of a Total Radiated Power (TRP), a Total Isotropic Sensitivity (TIS), and a channel delay.

4. The method of claim 1, wherein quantifying the antenna performance comprises:
   determining the antenna performance as an effective performance when the quantification result is greater than or equal to a threshold value, and
   wherein displaying the quantification result includes displaying a result of the effective performance determination.

5. The method of claim 1, wherein the antenna operates in a Raleigh fading environment, a Gaussian fading environment, or a Rician fading environment that is artificially generated.

6. The method of claim 5, wherein the Raleigh fading environment, the Gaussian fading environment, or the Rician fading environment is artificially generated within a closed space in which a uniform electromagnetic field is supplied.

7. The method of claim 1, further comprising:
   generating the original voice signal; and
   transmitting the original voice signal to at least one of the base station simulator which communicates with the antenna, or the terminal that communicates using the antenna.

8. The method of claim 1, wherein the terminal receives the wireless signal through the antenna, the wireless signal being emitted by the base station simulator.

9. The method of claim 1, wherein the base station simulator receives the wireless signal, the wireless signal being emitted through the antenna by the terminal.

10. The method of claim 1, further comprising:
    controlling the base station simulator communicating with the antenna to attempt a call connection to the terminal communicating by using the antenna a preset number of times;
    counting a number of successful call connections during the preset number of call connection attempts; and
    determining a reception rate of the antenna based on the preset number and the successful number of call connections.

11. The method of claim 1, further comprising:
controlling the terminal communicating by using the antenna to attempt a call connection to the base station simulator communicating with the antenna a preset number of times;
counting a number of successful call connections during the preset number of call connection attempts; and
determining a transmission rate of the antenna based on the preset number and the number of successful call connections.

12. The method of claim 1, further comprising:
determining whether a call which successfully connects is maintained for a preset time when call connection is attempted the preset number of times;
counting a number of call drops if the call which successfully connects is not maintained for the preset time; and
determining a call drop rate of the antenna based on the number of the call which successfully connect and the number of call drops.

13. A system for measuring an antenna performance, the system comprising:
a communication unit configured to obtain a voice signal received or transmitted through an antenna corresponding to an original voice signal from the antenna;
a controller configured to quantify the antenna performance to generate a quantification result by performing a quantification method based on the original voice signal and the obtained voice signal; and
a display unit configured to display the quantification result,
wherein the obtained voice signal is generated by demodulating a wireless signal by a terminal or a base station simulator, the wireless signal being modulated from the original voice signal and emitted by the base station simulator or the terminal.

14. The system of claim 13, wherein the controller is further configured to use a Perceptual Evaluation of Speech Quality (PESQ) quantification method as the quantification method to compare and evaluate a factor according to a channel environment of the antenna to quantify the antenna performance.

15. The system of claim 14, wherein the factor includes at least one of a Total Radiated Power (TRP), a Total Isotropic Sensitivity (TIS), and a channel delay.

16. The system of claim 13, wherein the controller is further configured to determine the antenna performance as an effective performance when the quantification result is greater than or equal to a threshold value, and the display unit displays the quantification result of the effective performance determination.

17. The system of claim 13, wherein the antenna operates in a Raleigh fading environment, a Gaussian fading environment or a Rician fading environment that is artificially generated.

18. The system of claim 17, wherein the Raleigh fading environment, the Gaussian fading environment, or the Rician fading environment is artificially generated within a closed space in which a uniform electromagnetic field is supplied.

19. The system of claim 13, wherein the controller is further configured to control the base station simulator communicating with the antenna to attempt a call connection to the terminal communicating by using the antenna a preset number of times, count a number of successful call connections during the preset number of call connection attempts, determine a reception rate of the antenna based on the preset number and the successful number of call connections, control the terminal communicating by using the antenna to attempt the call connection to the base station simulator communicating with the antenna the a preset number of times, count a number of successful call connections during the preset number of call connection attempts, and determine a transmission rate of the antenna based on the preset number and the number of successful call connections.

20. The system of claim 19, wherein the controller is further configured to determine whether a call which successfully connects is maintained for a preset time when call connection is attempted the preset number of times, counts a number of call drops if the call which successfully connects is not maintained for the preset time, and determine a call drop rate of the antenna based on the number of successfully connected calls and the number of call drops.

* * * * *